Feb. 21, 1933.    R. RUEMELIN    1,898,689
SAND REGULATOR AND SHUT-OFF
Filed April 4, 1929
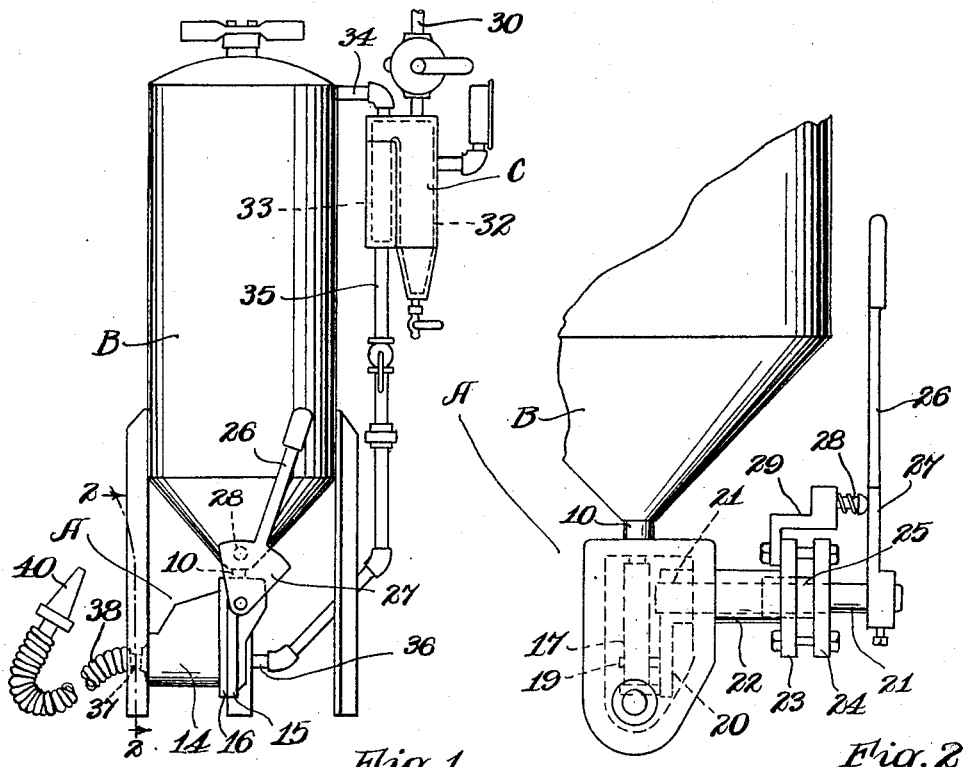
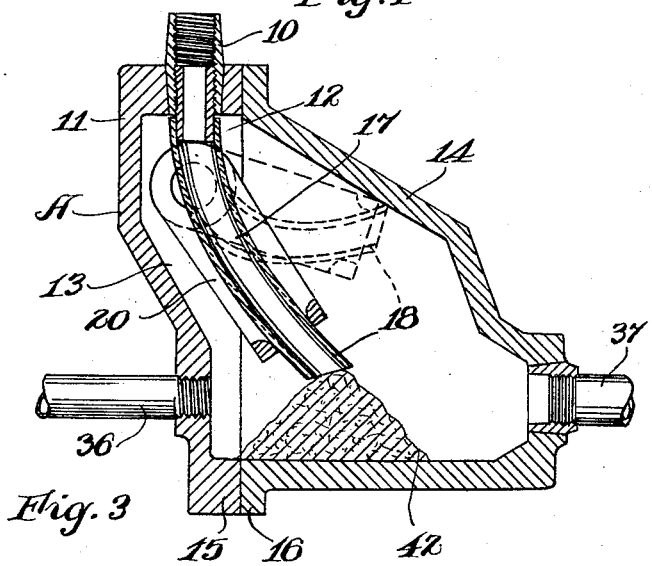
Inventor
Richard Ruemelin
By
Attorney Patented Feb. 21, 1933

1,898,689

UNITED STATES PATENT OFFICE

RICHARD RUEMELIN, OF MILWAUKEE, WISCONSIN

SAND REGULATOR AND SHUT-OFF

Application filed April 4, 1929. Serial No. 352,400.

My invention relates to a sand regulator and shut-off particularly adapted for use with sand tanks and sand mixing apparatus where the sand is used in sand blasting, and a feature of the invention resides in a flexible adjustable regulator end for the discharge opening of the sand into an air mixing chamber so that the sand may be readily regulated into the mixing chamber and shut-off when desired.

A feature of the invention resides in a simple air and sand mixing chamber made so that it can be easily opened and the parts within the chamber replaced when it is desired.

It is also a feature of my invention to provide a flexible replaceable discharge end concealed within the mixing chamber and leading from the discharge opening of the sand supply tank together with means for flexing the free end of the flexible member in such a manner as to move the same beyond the angle of repose to shut off the flow of sand from the supply tank into the mixing chamber.

The invention includes an air and sand mixing chamber wherein means of regulating the flow of sand from the supply tank is provided which may be easily operated to set the flow of sand in a manner so that a pre-determined amount of sand will flow automatically into the mixing chamber and by leaving the regulating mechanism in set position the flow of sand will not be disturbed or changed after it has been set even though the sand blast is shut-off temporarily, and this is very important for once the proper amount of sand is regulated for certain work it is imperative that it continue without change, otherwise a considerable loss of time in the use of the sand blast is experienced.

A feature of the invention is in a simply constructed sand and air mixing chamber having means for regulating the flow of sand into the same or shutting off the sand entirely, when it is desired, the parts being readily replaceable and particularly the flexible discharge end from the sand supply tank which is concealed within the sand mixing chamber.

It is also an important feature of the invention to provide a means of regulating the flow of sand including the flexible end member which will cause the sand to be shut off when the pile of sand accumulates in the mixing chamber to close off the end of the flexible member, when the flow of air stops through the mixing chamber, thus automatically shutting off the flow of the sand from the supply tank. The flexible construction of the sand regulator within the mixing chamber permits the same to be set in the desired position within the sand chamber so that the sand will flow in a suitable manner through the same or be entirely shut off by moving the free end of the same beyond the angle of repose.

These features together with other details and objects will be amplified and more clearly set forth in the specification and claims.

In the drawing forming part of my specification:

Figure 1 is a side elevation of my sand regulator and shut-off as it would appear in operation connected to a sand supply tank and air line with the air drier.

Figure 2 is a detail of a portion of the sand tank and sand regulator and shut-off taken on the line 2—2 of Figure 1.

Figure 3 is a side sectional view through my sand regulator and shut-off, illustrating the position of the parts in operation and the air inlet and outlet connections.

My sand regulator and shut-off A is associated with the sand supply tank B as illustrated in Figure 1 so that the sand will flow freely from the supply tank B directly into the sand regulator and shut-off A.

The sand regulator and shut-off A is connected by the pipe 10 to the sand tank B which is connected with the casing portion 11 of the sand regulator A and which is provided with a pipe 12 projecting into the chamber 13 in the sand regulator A.

The casing of the sand regulator A is made up of two parts, namely, the part 11, which forms a cover member for the regulator, and the part 14, which constitutes the major portion of the body or casing of the regulator A. The portions 11 and 14 are formed with abutting flanges 15 and 16, respectively, which are connected together by suitable bolts not illustrated in the drawing.

The pipe 12 is adapted to support a flexible hose-like member 17 which forms the flexible discharge end from the sand supply tank B into the sand regulator and shut-off A and the free end 18 of this flexible member 17 is adapted to be engaged by the lugs 19 which project on either side of the end 18, as illustrated in Figure 3, and which form a part of the operating lever 20 positioned within the chamber 13 and supported by the operating shaft 21 which projects through the boss 22 formed on the side of the casing portion 11. The portion 22 is adapted to form a bearing for the shaft 21 so that the shaft 21 can be rotated freely in the same. The outer end of the boss 22 carries a transverse flange 23 to which the flange 24 of the stuffing box gland 25 is connected so as to form an air-tight joint about the shaft 21.

The shaft 21 is adapted to be operated by the handle 26 which is secured to the outer end of the shaft 21 and the handle 26 is formed with a plate-like portion 27 which is engaged frictionally by the spring urged retarder 28 supported by the bracket 29 so that the handle 26 may easily be set in any desired position in the operation of the same.

When the handle 26 is operated the lugs, 19 engage the free end 18 of the flexible member 17 to move the same into different positions within the chamber 13, as illustrated in full and dotted lines in Figure 3. Thus, the flow of sand from the supply tank B is regulated into the sand regulator and shut-off A by regulating the position of the free end 18 of the flexible member 17. The flow of a stream of more or less sand can be regulated by moving the free end 18 of the flexible member 17. This constitutes my sand regulator and shut-off apparatus which regulates the flow of sand into the regulator A.

The compressed air is introduced through the pipe 30 from any suitable source of supply and from the pipe 30 passes into the drier C which has a pocket 32 on one side for receiving the moisture from the air, and the chamber 33 on the other side has an outlet pipe 34 which extends to the top of the sand supply tank B, and also a pipe 35 which passes the compressed air down to the straight line pipe 36 which is straight in line with the outlet pipe 37 from which the flexible hose 38 extends and which supports the sand blast nozzle 40. This provides a direct and straight line mixing process of the compressed air and sand whereby the maximum force of the blast is available at the nozzle outlet. The mixture of sand and air passes directly into the hose 38 without being compelled to travel around sharp bends or elbows which tend to reduce the force of the blast. My air and sand mixer A is so constructed as to permit the compressed air to be directed from the pipe 36 straight to the pipe 37 which is placed in axial alinement with the pipe 36 and thus as the sand flows in a stream from the flexible member 17 it will be carried by the compressed air from the pipe 36 through the pipe 37 and to the nozzle 40.

It will be noted that the construction of my sand blast air and sand mixer A is such as to eliminate parts which might become worn by the force of the sand blast and thus overcoming virtually all of the annoying troubles where the sand and air mixer is made of parts which easily become worn through the passage of the compressed air and sand in the sand blast stream.

It will be noted that the sand will fall from the end 18 of the flexible member 17 in virtually a conical shape as illustrated in Figure 3 so that if the compressed air is shut off in the pipe 36 at any time a conical mound of sand will build up at the end 18 of the flexible member 17 and stop the flow of sand out of the flexible member 17 or shut off the flow of sand. When the compressed air is again turned on it will carry the sand away from the free end 18 of the flexible feeder 17 and permit the sand to flow in the same relative stream as before. The position of the free end 18 in the chamber 13 of the mixer A determines the amount of flow from the flexible feeder 17.

Thus in operation the handle 26 is adjusted so as to adjust the end 18 of the flexible feeder 17 into position to feed the desired flow of sand into the mixer A. When this has been determined the handle 26 is left set at the desired position and the operator of the nozzle 40 can work with assurance that the sand blast will remain virtually the same throughout the entire operation. Therefore, if it is even necessary to turn off the air from the source of supply the sand blast will again be the same when it is turned on, excepting for momentarily while the mound of sand, such as 42, is blown away from the free end 18.

This is very important and the fact that there are no parts which will be easily worn or effected by the blast of air and sand through the mixer A, makes my mixer the more desirable for the operation because it will insure virtually the same mixture of sand and air throughout the operation. The flexible feeder member 17 is made of any suitable material such as tough rubber or pure gum rubber or other suitable material which is highly resisting to the blast of the sand and air. Thus the same is long wearing and this being virtually the only part which is effected in operation, it will be readily apparent that the construction and operation of my sand and air mixer A is extremely important.

In operating a sand blast it is often necessary to shut off the air. If it is also necessary to shut off the flow of sand to the mixing chamber at the same time it is very undesirable because it may take the operator a long time to get exactly the same sand blast mixture. This is entirely overcome by my sand and air mixer A for the reason that the flow of sand remains constant after it is once adjusted.

The sand may be entirely shut off by the flexible feeder 17 by raising the same with the operating handle 26 so that the free end is beyond the angle of repose and thus the flow of sand is shut off from the chamber 13 of the air and sand mixer A. The force of the air through the pipe 34 on top of the sand within the sand tank B causes the sand to flow more readily into the sand and air mixer A.

In accordance with the patent statutes I have described the principles of my sand regulator and shut off and while I have illustrated a particular construction and formation of the parts, I desire to have it understood that these are only illustrative and that the invention may be carried out by other means and applied to uses other than those above set forth within the scope of the following claims.

I claim:

1. A sand regulator and shut-off including a casing having a sand inlet therein, a hollow sand flexible feed member secured at one end adjacent said inlet, means for curving said member into different positions, and means providing a straight line air passage extending through said casing to pick up the flow of sand from the free unsecured end of said flexible member and carry it direct to a sand blast nozzle.

2. A sand regulator and air mixer including, a casing, means for attaching said casing to a sand supply tank, a hollow flexible feeder secured at one end to said casing and extending from said sand supply tank, means for adjusting the free unattached end of said feeder to raise or lower the same beyond the angle of repose to regulate the stream of sand therefrom, and means for passing a stream of compressed air through said mixer to provide a straight line mixing of sand and air adjacent the free end of said flexible member.

3. A sand regulator and air mixer including, a casing, a connection adapted to connect said casing with a source of sand supply, a flexible sand feeder pipe attached to said casing adjacent said connector, an adjuster for adjusting the position of the free unattached end of said pipe to operate the same to regulate the flow of sand from the source of supply, an inlet in said casing for compressed air, and an outlet for a sand blast in said casing directly opposite and in axial alinement with said air inlet.

4. A sand regulator shut-off and mixing device having a chamber, a curved hollow flexible feeder member means for increasing the curvature of said feeder to stop the flow of sand therethrough, and means providing an air line passage for compressed air through said chamber to pick up the stream of sand from said flexible member and form a sand blast.

5. A sand regulator and mixer having a mixing chamber, a hollow flexible feeder member within said chamber extending from a source of sand supply through which sand may flow, means for varying the position of said feeder from a free flow position to beyond the angle of repose to regulate the flow of a stream of sand into said chamber, and openings for passing compressed air in a straight line through said chamber in a manner to pick up the sand from said flexible feeder.

6. A sand and air mixer including, a casing, a hollow flexible sand feeder member secured at one end adjacent a sand inlet within said casing, means for moving the free end of said feeder to change the flow of the sand therefrom and to move the same beyond the angle of repose, and means providing a straight line compressed air passageway through said mixer.

7. A sand regulator including, a casing, a flexible tubular sand feeder supported at one end within said casing to feed a stream of sand therein, a bifurcated arm operable within said casing and adapted to engage the free end of said flexible feeder member, to change the position of the same, a shaft extending from said casing upon which said arm is mounted adapted to operate said arm, a handle for operating said shaft, and a retarder for said handle.

8. A sand regulator for sand blast including, a casing, a sand chamber within said casing, a flexible tubular feeder member adapted to feed a stream of sand into said casing, an operating lever adapted to engage said flexible member to move the same to regulate the flow of sand into said casing and said flexible member beyond the angle of repose, means for operating said lever from without said casing to set the same into different positions, and means providing a passageway for compressed air into and out of said casing in line with the flow of sand from said flexible feeder.

9. A sand and air mixer including, a casing, a tubular replaceable flexible feeder member made of tough material, open at all times and secured at one end adjacent a sand inlet in said casing, means for swinging the free end of said feeder member through various angles to beyond the angle of repose to regulate the flow of sand therefrom, and means for passing a stream of air through said casing in line with the free end of said feeder member to form a sand blast.

RICHARD RUEMELIN.